United States Patent
Ilan et al.

(10) Patent No.: US 9,838,500 B1
(45) Date of Patent: Dec. 5, 2017

(54) NETWORK DEVICE AND METHOD FOR PACKET PROCESSING

(71) Applicant: Marvell International Ltd., Hamilton (BM)

(72) Inventors: Dan Ilan, Herzelia (IL); Uri Dayan, Herzelia (IL)

(73) Assignee: MARVELL ISRAEL (M.I.S.L) LTD., Yokneam (IL)

( * ) Notice: Subject to any disclaimer, the term of this patent is extended or adjusted under 35 U.S.C. 154(b) by 402 days.

(21) Appl. No.: 14/643,186

(22) Filed: Mar. 10, 2015

Related U.S. Application Data

(60) Provisional application No. 61/951,245, filed on Mar. 11, 2014.

(51) Int. Cl.
*H04L 29/08* (2006.01)
*G06F 12/02* (2006.01)

(52) U.S. Cl.
CPC ........ *H04L 67/2852* (2013.01); *G06F 12/023* (2013.01); *G06F 2212/263* (2013.01)

(58) Field of Classification Search
CPC ......... H04L 29/06; H04L 12/28; H04L 12/56; H04L 12/26; H04J 1/02; G06F 15/167
See application file for complete search history.

(56) References Cited

U.S. PATENT DOCUMENTS

| | | | | |
|---|---|---|---|---|
| 5,325,493 A * | 6/1994 | Herrell | ................. | G06F 15/17 712/201 |
| 6,314,477 B1 * | 11/2001 | Cowger | ................. | H04L 47/10 370/394 |
| 6,438,610 B1 * | 8/2002 | Pearson | ................. | H04L 29/06 709/219 |
| 7,107,383 B1 * | 9/2006 | Rajan | ................. | G06F 13/128 710/306 |
| 7,558,193 B2 * | 7/2009 | Bradbury | ............ | H04L 12/6402 370/217 |
| 7,895,431 B2 * | 2/2011 | Bouchard | ............... | H04L 12/56 370/395.4 |
| 8,312,129 B1 * | 11/2012 | Miller | ................. | H04L 41/0803 370/254 |
| 8,370,488 B1 * | 2/2013 | Miller | ................. | H04L 12/6418 709/203 |
| 2008/0016275 A1 * | 1/2008 | Sebastian | .............. | G06F 3/0613 711/114 |
| 2009/0055422 A1 * | 2/2009 | Williams | ................ | H03M 7/30 |

(Continued)

*Primary Examiner* — Andrew Lai
*Assistant Examiner* — Hoyet H Andrews, III

(57) ABSTRACT

A network device and method for packet processing are provided. A packet processing accelerator is configured to receive packets from a network and define for ones of the packets a data unit corresponding to the packet. The packet processing accelerator is configured to perform a first set of packet processing operations on the data unit. A central processing unit (CPU) is configured to perform a second set of packet processing operations on the data unit. A buffer is configured to pass data units from the packet processing accelerator to the CPU, and vice versa, where the buffer is configured to store data units in one or more lines of the buffer. Dummy data units fill a space in a buffer line that is not occupied by a data unit, and the dummy data units include an indication that the space occupied by the dummy data units is an empty space.

18 Claims, 12 Drawing Sheets

(56) References Cited

U.S. PATENT DOCUMENTS

| | | | |
|---|---|---|---|
| 2009/0092136 A1* | 4/2009 | Nazareth | H04L 45/745 370/392 |
| 2009/0216937 A1* | 8/2009 | Yasufuku | G06F 12/0246 711/103 |
| 2010/0257308 A1* | 10/2010 | Hsu | G06F 12/0246 711/103 |

* cited by examiner

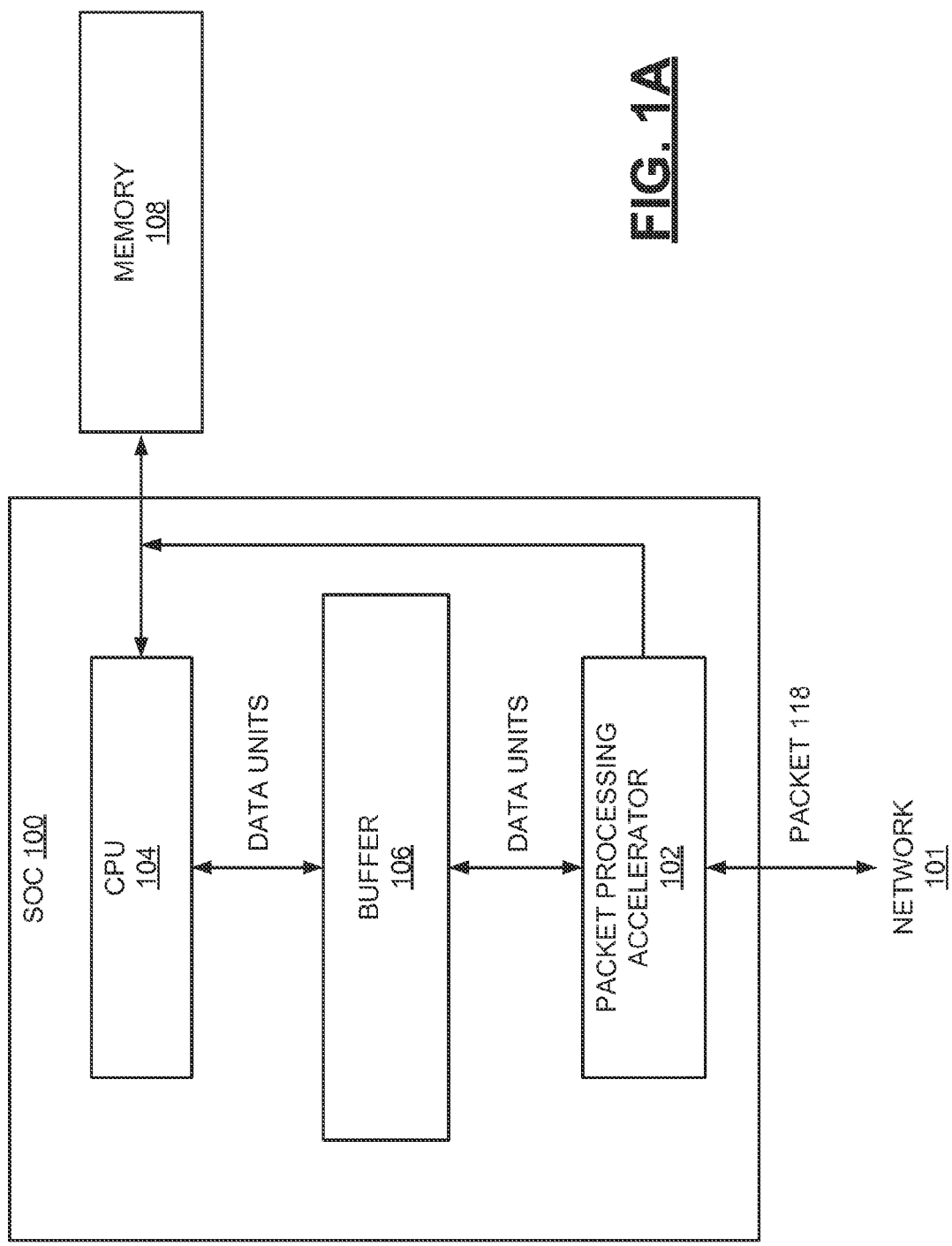

NETWORK DEVICE AND METHOD FOR PACKET PROCESSING

CROSS-REFERENCE TO RELATED APPLICATIONS

This application claims priority to U.S. Provisional Patent Application No. 61/951,245, filed Mar. 11, 2014, entitled "Variable-size Packet Descriptor in a Packet Processing Accelerator," which is incorporated herein by reference in its entirety.

FIELD

The technology described herein relates generally to data communications and more particularly to systems and methods for packet processing at a network device.

BACKGROUND

Emerging network devices include hardware elements that are configured to efficiently perform certain packet processing tasks, such as parsing. In addition, the emerging devices also include software processing elements that perform different processing operations using, for example, data that is parsed from the packets. The hardware elements of the network devices need to efficiently transfer data structures to the software processing elements, and vice versa.

The description above is presented as a general overview of related art in this field and should not be construed as an admission that any of the information it contains constitutes prior art against the present patent application.

SUMMARY

Examples of a network device and a method for packet processing are provided. An example network device includes a packet processing accelerator configured to receive packets from a network and define for ones of the packets a data unit corresponding to the packet. The data unit is defined at least by metadata related to the packet. The packet processing accelerator is also configured to perform a first set of packet processing operations on the data unit. The example network device also includes a central processing unit (CPU) configured to perform a second set of packet processing operations on the data unit. The second set of packet processing operations is different from the first set of packet processing operations and is defined by programmable code executed in the CPU. A buffer defined in a memory is configured to pass data units from the packet processing accelerator to the CPU, and vice versa, where the buffer has a fixed width and is configured to store data units in one or more lines of the buffer. Dummy data units fill a space in a buffer line that is not occupied by a data unit when the data unit does not fill a complete buffer line, and the dummy data units include an indication that the space occupied by the dummy data units is an empty space.

As another example, in a method for packet processing, packets are received from a network. A data unit corresponding to a packet is defined for ones of the packets, where the data unit is defined at least by metadata related to the packet. A first set of packet processing operations is performed on the data unit at a packet processing accelerator. Data units are passed from the packet processing accelerator to a central processing unit (CPU), and vice versa, via a buffer defined in a memory. The buffer has a fixed width and is configured to store data units in one or more lines of the buffer. The passing of the data units includes filling a space in a buffer line that is not occupied by a data unit with dummy data units when the data unit does not fill a complete buffer line, where the dummy data units include an indication that the space occupied by the dummy data units is an empty space. A second set of packet processing operations is performed on the data unit at the CPU, where the second set of packet processing operations is defined by programmable code executed in the CPU and is different from the first set of packet processing operations.

BRIEF DESCRIPTION OF THE DRAWINGS

FIG. 1A is a block diagram depicting a system-on-chip (SOC) in accordance with an embodiment of the disclosure.

DETAILED DESCRIPTION

Figure 1B:
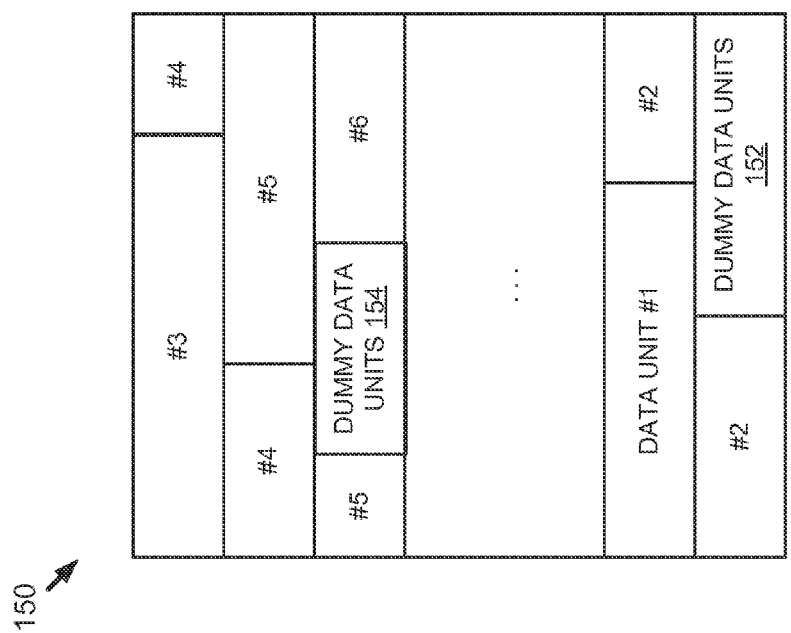
FIG. 1B is a block diagram depicting features of the buffer depicted in FIG. 1A, in accordance with an embodiment of the disclosure.

FIG. 1A is a block diagram depicting a system-on-chip (SOC) 100 in accordance with an embodiment of the disclosure. In an example, the SOC 100 comprises at least a portion of a network device that is used in a packet-switching network to forward data packets from a source to a destination. The SOC 100 is generally used in a computer networking device that connects two or more computer systems, network segments, subnets, and so on. For example, the SOC 100 comprises at least a portion of a switch in one embodiment. The SOC 100 is not limited to a particular protocol layer or to a particular networking technology (e.g., Ethernet), and the SOC 100 comprises a portion of a bridge, a router, or a VPN concentrator, among other devices, in one embodiment.

The SOC 100 is configured, generally, to receive a packet 118, such as an Ethernet packet, from a network 101, and to process the packet 118. In an example, the processing of the packet 118 is performed by one or more processors implemented as one or more integrated circuits disposed at least on the SOC 100. These integrated circuits for performing the processing are included at least in packet processing accelerator 102 and central processing unit (CPU) 104 components of the SOC 100, which are described in greater detail below. The SOC 100 is further configured, in an example, to forward the packet 118 to a final destination or another packet processing system.

In an example, the packet 118 is a data packet received at the SOC 100 via an input/output (IO) interface of the packet processing accelerator 102. In an example, the packet processing accelerator 102 is a Network and Security Subsystem (NSS) component of the SOC 100. The packet processing accelerator 102 is configured, generally, to receive and process packets from the network 101. The processing of the packets performed by the packet processing accelerator 102 is described in further detail below. In addition to receiving the packet 118, the packet processing accelerator 102 is further configured to define a data unit corresponding to the packet 118, in an embodiment. In an example, the data unit defined by the packet processing accelerator 102 is known as a "descriptor" and comprises a data structure for storing various information relating to the packet 118. The information stored by the data unit includes metadata related to the packet 118, in an embodiment. In an example, the metadata stored by the data unit includes (i) a buffer descriptor that includes a pointer to a location of a payload of the packet 118 stored in a memory 108, (ii) indicators of the required processing that the packet 118 should undergo, and (iii) data that classifies the packet (e.g., data that classifies the packet into a packet flow or group, based on, for example, a priority of the packet and/or a Quality of Service that the packet should receive), among other data. It is noted that the metadata described herein are only examples, and that the metadata stored by the data unit includes various other information related to the packet, in an example. In an example, the data unit stores a header, or a part of the header, of the packet 118.

Processing of the data unit corresponding to the packet 118 occurs at the packet processing accelerator 102 and at the CPU 104 of the SOC 100. Specifically, in an example, the packet processing accelerator 102 is configured to perform a first set of packet processing operations on the data unit, and the CPU 104 is configured to perform a second set of packet processing operations on the data unit, where the second set of packet processing operations is different from the first set of packet processing operations. The first set of packet processing operations includes (i) classifying packets into groups, per their priority and/or a Quality of Service that the packets should receive, and/or (ii) dropping low-priority packets when the traffic nears the capacity of the packet processing accelerator 102, in an embodiment. The packet processing accelerator 102 performs the first set of packet processing operations in hardware, in an embodiment. In an alternative embodiment, the first set of packet processing operations are performed in a combination of hardware and firmware (e.g., black-box software that is invisible to the CPU 104). The second set of packet processing operations performed by the CPU 104 is defined by software (e.g., programmable code) that is executed by the CPU 104, in an embodiment. The second set of packet processing operations includes (i) additional (e.g., deeper) classifying of the packets into groups that not covered by the packet processing accelerator 102, and/or (ii) routing packets within the SOC 100 or to other systems, in an example. In an example, the performing of the first set of packet processing operations in the packet processing accelerator 102 improves an efficiency and packet throughput of the SOC 100 by offloading some of the processing that would otherwise be performed in the CPU 104.

To enable the processing of the data unit in both the packet processing accelerator 102 and the CPU 104, the SOC 100 includes a buffer 106 that is configured to pass data units between the packet processing accelerator 102 and the CPU 104. Although the example of FIG. 1 illustrates the buffer 106 as being separate from the memory 108, in other examples, the buffer 106 comprises a portion of the memory 108. In such examples, the packet processing accelerator 102 and the CPU 104 exchange data via this portion of the memory 108. Thus, in an embodiment, the buffer 106 is a space defined in a larger memory, such as the memory 108, that is shared by the packet processing accelerator 102 and the CPU 104.

In an example, the buffer 106 has a fixed width and is configured to store data units in one or more lines of the buffer 106. The lines of the buffer 106 are referred to as "buffer lines" herein. In an example, the data units stored in the one or more lines of the buffer 106 do not have a uniform length (e.g., data units do not have a uniform length that is generally the same as a width of the buffer 106). The data units stored in the buffer 106 thus have different sizes, with a size of a data unit depending, in an example, on a type of a packet with which the data unit is associated.

The packet processing accelerator 102 and the CPU 104 respectively are configured to write a plurality of data units to the buffer 106, with the writing of the data units causing the buffer 106 to be populated, at a given time, with data units having different sizes. To illustrate aspects of the writing of variable-sized data units to the buffer 106, reference is made to FIG. 1B. This figure is a block diagram depicting a portion 150 of the buffer 100 depicted in FIG. 1A, in accordance with an embodiment of the disclosure. FIG. 1B shows the portion 150 of the buffer 106 storing data units (numbered 1-6) having different sizes.

The packet processing accelerator 102 and the CPU 104 are also configured to write dummy data units to the buffer 106 to enable more efficient passing of data units between the packet processing accelerator 102 and the CPU 104. Such dummy data units (also known as "null data units" or "dummy buffers") fill a space in a buffer line that is not occupied by a valid data unit corresponding to a packet, in an embodiment. In an example, the dummy data units include an indication that the space occupied by the dummy data units is an empty space. To illustrate example uses of the dummy data units, FIG. 1B depicts the portion 150 of the buffer 106 storing dummy data units 152, 154 written to the buffer 100 by the packet processing accelerator 102 or the CPU 104. In some instances, when writing a data unit to the buffer 100, the packet processing accelerator 102 and the CPU 104 respectively are configured to (i) write dummy data units to a line of the buffer 106, and (ii) write the data unit starting at a buffer location immediately following an end of the dummy data units, in an embodiment. For example, in FIG. 1B, when writing the Data Unit #6 to the buffer 106, the packet processing accelerator 102 or the CPU 104 writes the dummy data units 154 and then writes the Data Unit #6 starting at the buffer location immediately following an end of the dummy data units 154. Prior to writing the dummy data units 154, the packet processing accelerator 102 or the CPU 104 determines a size of the dummy data units 154, in an embodiment. Example algorithms used by the packet processing accelerator 102 and the CPU 104 in determining the size of the dummy data units 154 are described in detail below. In other examples, the data unit is not written starting at a buffer location immediately following an end of the dummy data units. In these examples, the data unit is offset from the preceding dummy data units by a predetermined distance. The predetermined distance is zero in an embodiment in which the data unit is written starting at the buffer location immediately following the end of the dummy data units. However, the predetermined distance is a finite offset distance in other embodiments.

Example conditions under which such dummy data units are written to the buffer 100 are described in further detail below. In an example, the packet processing accelerator 102 and the CPU 104 respectively are configured to identify a condition under which a data unit could be written to multiple, non-contiguous lines of the buffer 106. This condition is undesirable, as multiple memory accesses to the buffer 106 would be required to read the data unit from the non-contiguous buffer lines. Upon identification of this condition, the packet processing accelerator 102 and the CPU 104 respectively are configured to write dummy data units to a line of the buffer 106. As described in further detail below, this writing of the dummy data units eliminates the undesirable condition, such that the data unit is written to a single buffer line or multiple contiguous lines of the buffer 106.

In some instances, the packet processing accelerator 102 and the CPU 104 respectively are configured to write dummy data units of a size that complete a line of the buffer 106. An example of this is shown in FIG. 1B, which depicts the dummy data units 152 being dimensioned to complete a last buffer line of the portion 150 of the buffer 100. In other instances, the packet processing accelerator 102 and the CPU 104 respectively are configured to write dummy data units of a size that do not complete a line of the buffer 106. For example, FIG. 1B depicts the dummy data units 154 that do not complete a line of the buffer 100. Example uses of dummy data units that complete a line of the buffer 106 and example uses of dummy data units that do not complete a line of the buffer 106 are described in further detail below. It is noted that the packet processing accelerator 102 and the CPU 104 respectively are configured to write the dummy data units to any of the lines of the buffer 106.

The packet processing accelerator 102 and the CPU 104 are also respectively configured to read from the buffer 106, where the reading includes the reading of both valid data units and dummy data units. In some instances, the packet processing accelerator 102 and the CPU 104 respectively are configured to (i) read the dummy data units and a data unit from the buffer 106, and (ii) discard the dummy data units based on the dummy data units' indication that the space occupied by the dummy data units is an empty space. In such instances, the packet processing accelerator 102 and the CPU 104 respectively are configured to discard the dummy data units without performing the first or second sets of packet processing operations on the dummy data units. In other instances, dummy data units and a data unit stored in the buffer 106 are moved from the buffer 106 to an internal cache of the memory 108. In an example where the buffer 106 comprises a portion of the memory 108, the dummy data units and the data unit are moved from the buffer 106 to another portion of the memory 108 (e.g., the portion of the memory 108 including the internal cache). The movement occurs without explicit action by the packet processing accelerator 102 or the CPU 104, in an embodiment. In these examples where data is moved from the buffer 106 to another portion of the memory 108 without explicit action by the packet processing accelerator 102 or the CPU 104, transparent mechanisms such as caching and coherency move the data without requiring the packet processing accelerator 102 or CPU 104 to read and write the data. The dummy data units moved from the buffer 106 to the memory 108 complete a line of the memory 108 (e.g., a cache line of an internal cache of the memory 108), in an embodiment.

Figure 2:
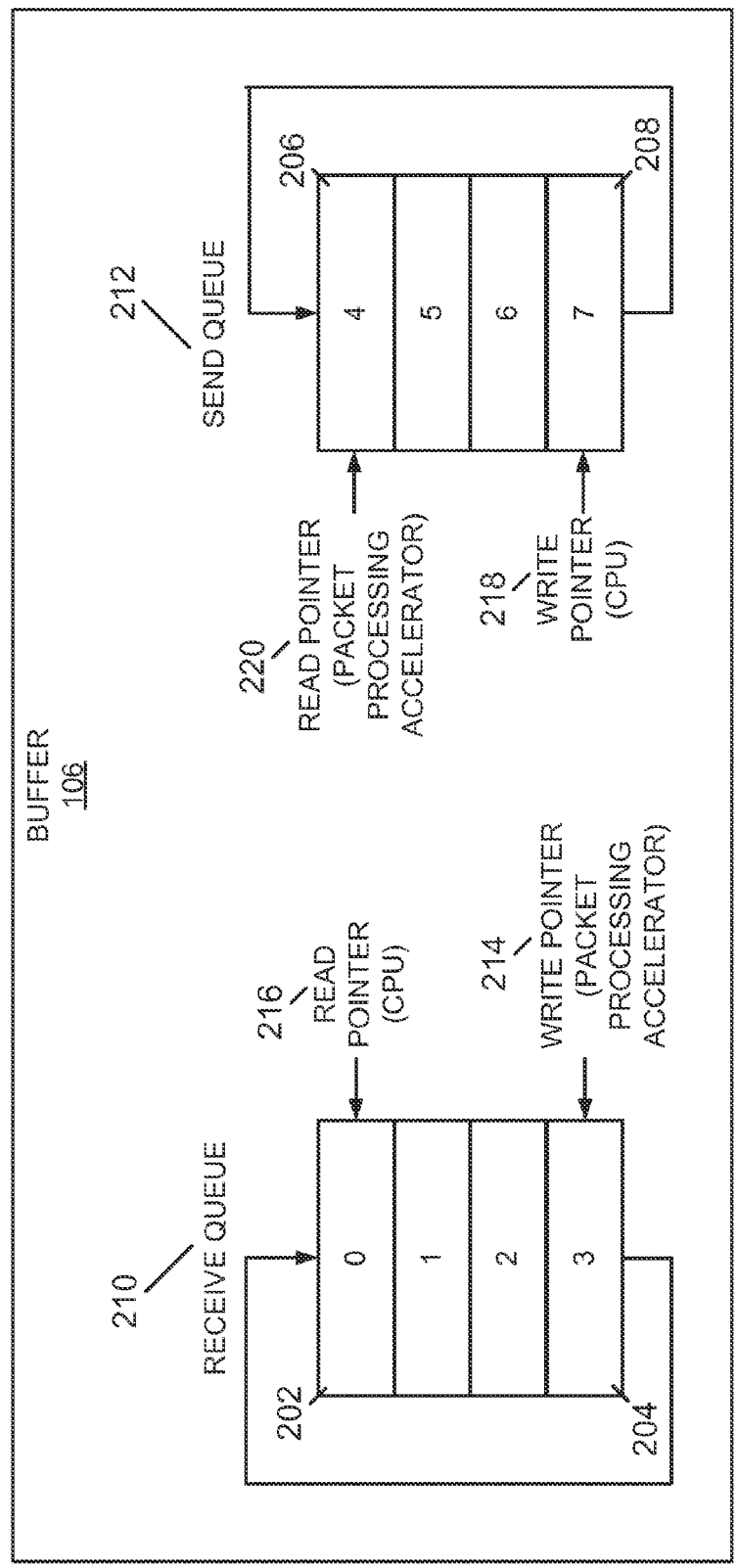
FIG. 2 is a simplified block diagram illustrating additional features of the buffer depicted in FIG. 1A, in accordance with an embodiment of the disclosure.

FIG. 2 is a block diagram illustrating additional features of the buffer 106 depicted in FIG. 1A, in accordance with an embodiment of the disclosure. As shown in FIG. 2, the buffer 106 includes a receive queue 210 and a send queue (i.e., transfer queue) 212, in an embodiment. In passing data units from the packet processing accelerator 102 to the CPU 104, the receive queue 210 is utilized. Thus, the packet processing accelerator 102 writes a data unit to the receive queue 210 starting at a location determined by a write pointer 214, and the CPU 104 subsequently reads the data unit from the receive queue 210 based on a read pointer 216. In passing data units from the CPU 104 to the packet processing accelerator 102, the send queue 212 is utilized. The CPU 104 writes a data unit to the send queue 212 starting at a location determined by a write pointer 218, and the packet processing accelerator 102 subsequently reads the data unit from the send queue 212 based on a read pointer 220.

In an example, the receive and send queues 210, 212 comprise circular queues (i.e., cyclic queues) configured to queue data units during the passing of the data units between the packet processing accelerator 102 and the CPU 104. Each of the circular queues 210, 212 has a head of the queue comprising a first buffer line of the buffer 106 and a tail of the queue comprising a second buffer line of the buffer 106. As shown in FIG. 2, the circular receive queue 210 has a fixed maximum size of four buffer lines, and additional lines of the buffer 106 cannot be allocated to the queue 210, in an example. A head of the queue 210 comprises a first buffer line 202 (numbered "0" in FIG. 2), and a tail of the queue 210 comprises a second buffer line 204 (numbered "3"). Similarly, the circular send queue 212 has a fixed maximum size of four buffer lines, with buffer lines 206 and 208 comprising the head and tail of the queue 212, respectively. In each of the circular queues 210, 212, the first and last buffer lines comprising the respective heads and tails of the queues 210, 212 are located at multiple, non-contiguous lines of the buffer 106, in an embodiment. Further, each of the circular queues 210, 212 has a fixed width that is equal to the fixed width of the buffer 106. In an example, the queues 210, 212 are defined by programmable code (e.g., software) executed in the CPU 104.

To implement the "circular" (i.e., "cyclic") nature of the queues 210, 212, in each of the queues, the tail of the queue is connected back to the head of the queue via a linking indication (e.g., a pointer), such that read and write pointers to the queue wrap around to a start of the queue upon reaching an end of the queue. Thus, for example, in the receive queue 210 of FIG. 2, after the packet processing accelerator 102 writes data to the end of the receive queue 210, the write pointer 214 wraps around to the start of the queue 210. Next data written to the queue 210 starting a location determined by the write pointer 214 is stored at the start of the queue 210.

With reference again to FIG. 1A, the packet processing accelerator 102 and the CPU 104 are also respectively configured to store data to the memory 108. As explained above, in some examples, the buffer 106 comprises a portion of the memory 108 that is shared by the packet processing accelerator 102 and the CPU 104. The memory 108 comprises at least a portion of the network device but is not disposed on the SOC 100, in an embodiment. In other embodiments, the memory 108 is integrated into the SOC 100. In an example, portions of the SOC 100 are distributed across multiple silicon dies that are coupled, for example, by way of a silicon interposer. In this example, the collection of dies makes up the SOC 100. In an embodiment, the respective accelerator 102, CPU 104, and possibly memory 108, are respectively disposed on separate silicon dies. In an example, upon receipt of the packet 118, the packet processing accelerator 102 defines the data unit corresponding to the packet 118 based on metadata related to the packet 118 (as described above) and then writes a payload of the packet to the memory 108. The payload is stored in a payload portion of the memory 108, in an embodiment. The packet payload remains stored in the memory 108 and is accessed only when needed. With the packet payload stored to the memory 108, only the data unit corresponding to the packet 118 is transferred between the packet processing accelerator 102 and the CPU 104 via the buffer 106, in an embodiment. As noted above, the data unit corresponding to the packet 118 stores a pointer to a location of the payload of the packet 118 in the memory 108. Additionally, as described in further detail below with reference to FIGS. 5A-6, data units held in the receive and send queues 210, 212 of the buffer 106 are moved to an internal cache of the memory 108, in an embodiment. In examples where the buffer 106 comprises a portion of the memory 108, the data units are moved from a first portion of the memory 108 (e.g., a first portion comprising the receive and send queues 210, 212) to a second portion of the memory 108 (e.g., a second portion comprising the internal cache of the memory 108), in an embodiment. The passing of data units between the different portions of the memory 108 is performed without explicit action by the packet processing accelerator 102 or the CPU 104, in an embodiment. As described below, the writing of dummy data units to the receive and send queues 210, 212 enables this passing of data units to be more efficient (e.g., to require fewer memory accesses).

As described herein, the buffer 106 is defined in a memory space shared by the packet processing accelerator 102 and the CPU 104. In an example, the shared memory space is the memory 108 illustrated in FIG. 1 and described herein. In some embodiments, the memory space comprises static random-access memory (SRAM), and in other embodiments, the memory space comprises dynamic random-access memory (DRAM). The shared memory space also stores packet payloads in an embodiment, but not necessarily.

As described above, data units corresponding to packets are transferred between the packet processing accelerator 102 and the CPU 104 via the queues 210, 212 of the buffer 106. In order to save storage space and transfer bandwidth, the schemes and mechanisms described herein accommodate data units having different sizes. By allowing data units to have different sizes, information (e.g., a packet's header, software-firmware fields, etc.) can be stored in a data unit only when the information is needed, thus avoiding a fixed-size data unit that stores information regardless of whether the information is needed. The variable-sized data unit approach described herein allows data units to be kept as small as possible, in an example. The use of data units having different sizes varies from conventional approaches, which utilize data units having a fixed size, in which the data units themselves typically are padded to maintain size uniformity of the data units.

Figure 3A:
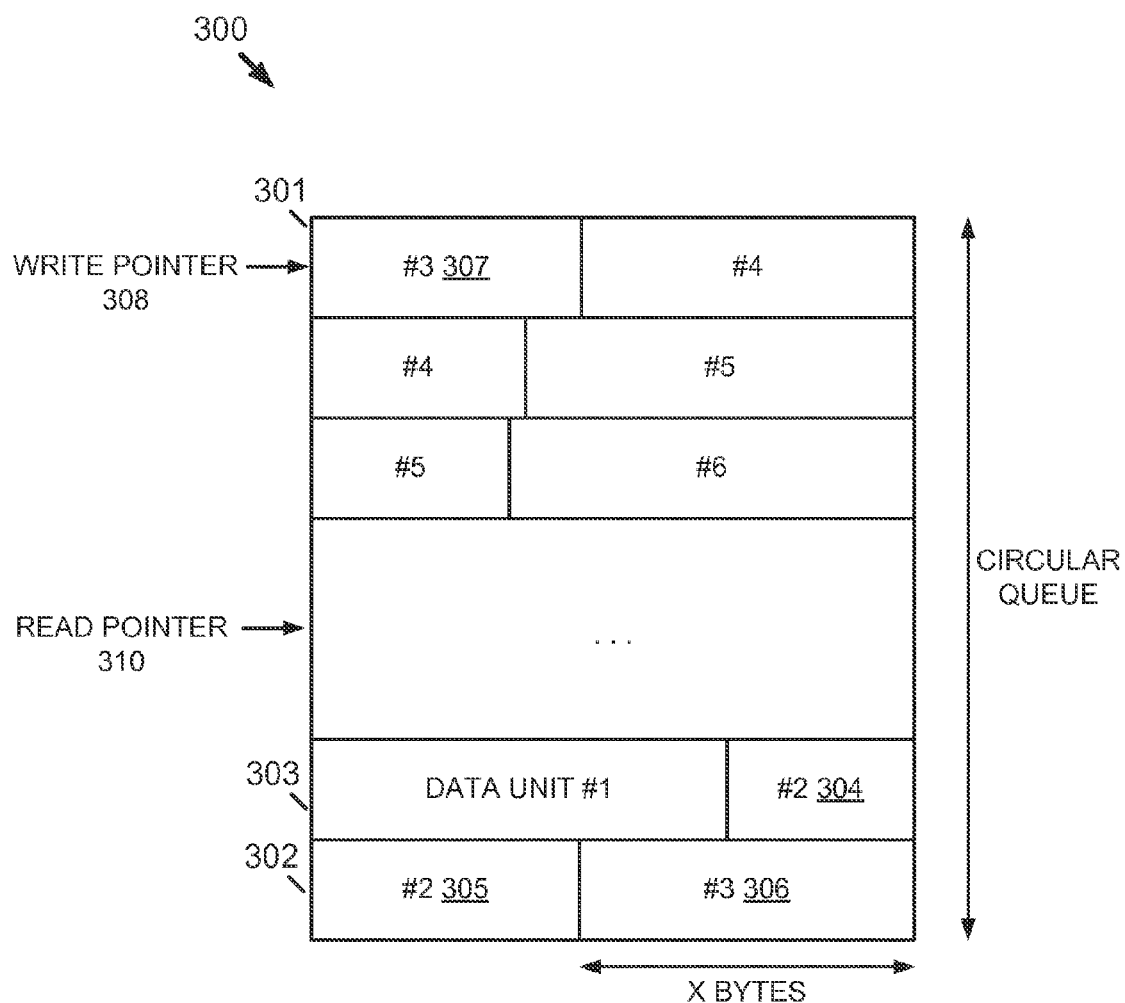
FIGS. 3A and 3B are block diagrams illustrating circular queues configured to store data units having different sizes, in accordance with an embodiment of the disclosure.

To illustrate aspects of the variable-sized data unit approach, reference is made to FIG. 3A. This figure depicts a circular queue 300 configured to store data units having different sizes. In an example, the circular queue 300 is the receive queue 210 or the send queue 212 of the buffer 106. Thus, the queue 300 comprises a fixed number of lines of the buffer 106 and has a head of the queue comprising a first buffer line 301 of the buffer 106 and a tail of the queue comprising a second buffer line 302 of the buffer 106. The tail of the queue 300 is connected back to the head of the queue 300 via a linking indication, such that write and read pointers 308, 310 wrap around to a start of the queue 300 upon reaching an end of the queue 300. In the circular queue 300, the first and second buffer lines 301, 302 comprising the respective head and tail of the queue 300 are disposed at multiple, non-contiguous lines of the buffer 106, in an embodiment.

In the example of FIG. 3A, the circular queue 300 is configured to store data units (numbered 1-6) having different sizes, with one or more of the data units being stored starting at locations of the buffer 106 that are not beginnings of buffer lines. For example, in FIG. 3A, although Data Unit #1 is stored starting at a beginning of a buffer line, Data Unit #2 is stored starting at an intermediate position of the same buffer line that is not the beginning of the buffer line. Thus, the packet processing accelerator 102 and the CPU 104 respectively are configured to write data units to the buffer 106 (i) starting at beginnings of buffer lines, and (ii) starting at locations of the buffer 106 that are not beginnings of buffer lines.

The circular queue 300 is also configured to store a data unit having a size that is greater than an amount of available space in a given buffer line in multiple lines of the buffer. In an example, a first portion of the data unit is stored in the given buffer line, and a second portion of the data unit is stored in at least one other buffer line that is different than the given buffer line. The packet processing accelerator 102 and the CPU 104 respectively are configured to write the data units to the buffer 106 in this manner. For example, in FIG. 3A, after the Data Unit #1 is written to a buffer line 303, it can be seen that the Data Unit #2 has a size that is greater than the amount of available space in the buffer line 303. Consequently, the packet processing accelerator 102 or the CPU 104 writes the Data Unit #2 to multiple lines of the buffer 106, with a first portion 304 of the Data Unit #2 being written to the buffer line 303 and a second portion 305 of the Data Unit #2 being written to the buffer line 302.

The circular or cyclic nature of the queue 300 (e.g., where pointers 308, 310 accessing the queue 300 wrap around upon reaching the end of the queue 300) creates the possibility that portions of a data unit could be written to both the head buffer line and the tail buffer line of the queue 300. This possibility is illustrated in FIG. 3A. After the packet processing accelerator 102 or the CPU 104 writes the first and second portions of the Data Unit #2 to the buffer lines 303, 302, respectively, a Data Unit #3 is to be written to the circular queue 300 starting at a location immediately following an end of the Data Unit #2. An amount of available space in the buffer line 302 is X bytes, as illustrated in FIG. 3A. Because the Data Unit #3 has a size that is greater than X bytes, the Data Unit #3 is stored in multiple lines of the buffer. Thus, the packet processing accelerator 102 or the CPU 104 writes a first portion 306 of the Data Unit #3 to the buffer line 302. After the writing of the first portion 306 to the buffer line 302, the write pointer 308 reaches the end of the queue 300 and wraps around to the start of the queue 300. This is illustrated in FIG. 3A, which shows the write pointer 308 positioned at the start of the queue 300. After the write pointer 308 wraps around, the packet processing accelerator 102 or the CPU 104 writes a second portion 307 of the Data Unit #3 to the buffer line 301.

As noted above, the buffer lines 301, 302 comprising the head and tail of the queue 300, respectively, are located at multiple, non-contiguous lines of the buffer 106, in an embodiment. Because the packet processing accelerator 102 and the CPU 104 access the circular queues 210, 212 of the buffer 106 via standard buses in burst transactions to a contiguous memory range, the splitting of the Data Unit #3 between the head and tail of the queue 300 requires the packet processing accelerator 102 or the CPU 104 to perform two memory accesses to read this data unit. This is undesirable, as it is inefficient to require multiple memory accesses to read the data unit. It is also undesirable because the second memory access could be a cache miss or a page miss due to the wrap around. As explained above, the buffer 106 comprises a portion of the memory 108, in an embodiment. In some examples, the memory 108 is DRAM memory. The DRAM memory serves faster data that belongs to the same cache line or page (e.g., where the cache line or page has a size of several KBs) that was recently accessed. A memory access after a wrap around (e.g., a wrap around as described above, where first data is written to the end of the queue, a write pointer wraps around to the start of the queue, and second data is written to the start of the queue) increases the probability of this situation occurring.

In order to eliminate or minimize the occurrence of such undesirable situations, the techniques described herein utilize dummy data units. Such dummy data units are intentionally written to the queues 210, 212 of the buffer 106 to prevent the undesirable situation illustrated in FIG. 3A, in an embodiment. The determination as to when the dummy data units should be written to a queue and the actual writing of the dummy data units are performed by the packet processing accelerator 102 or the CPU 104 writing to the queue. Thus, with reference to FIGS. 1A and 2, the packet processing accelerator 102 that writes to the receive queue 210 determines when the dummy data units should be written to the receive queue 210 and performs the writing of the dummy data units to the receive queue 210. Likewise, the CPU 104 that writes to the send queue 212 determines when the dummy data units should be written to the send queue 212 and performs the writing of the dummy data units to the send queue 212.

Figure 3B:
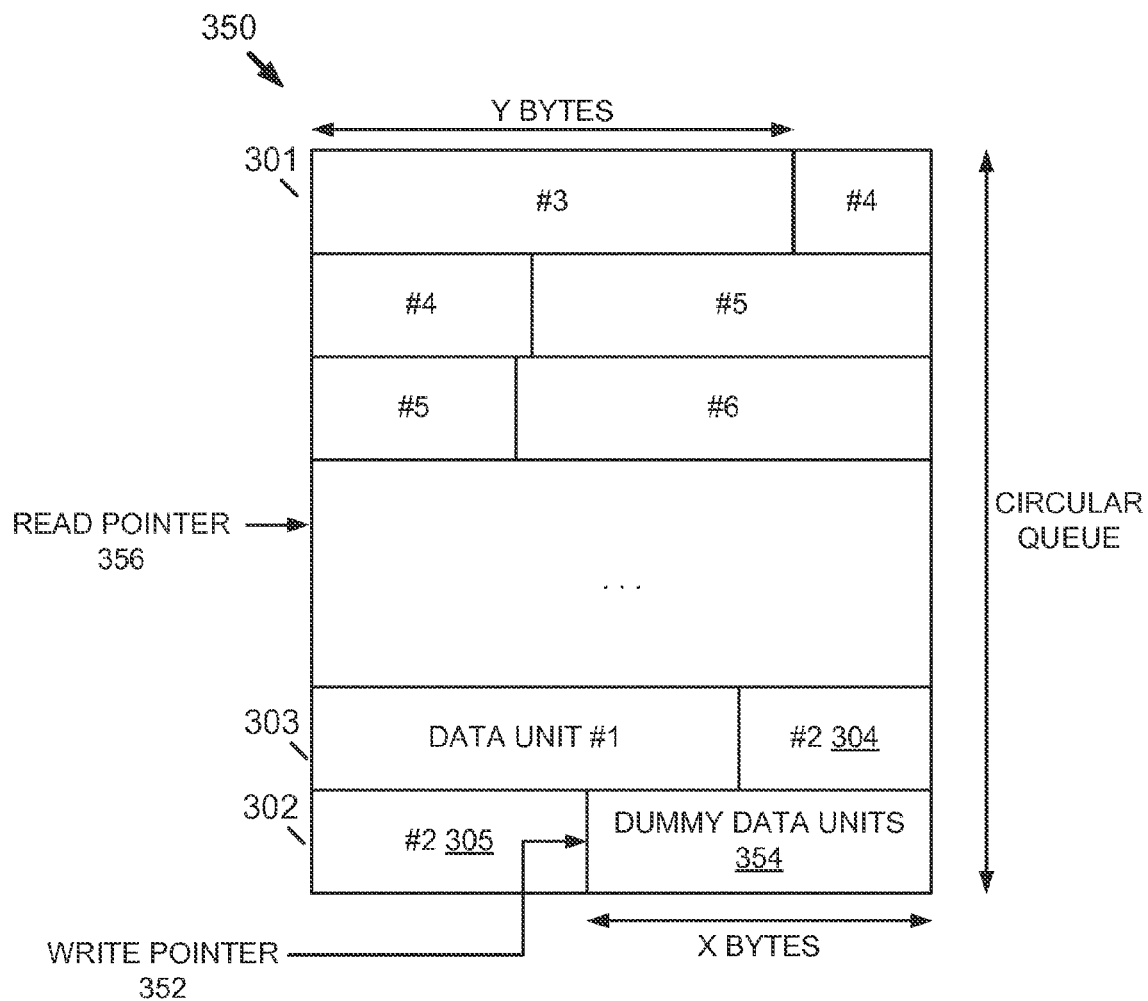

To illustrate an example use of the dummy data units, FIG. 3B depicts a circular queue 350. The circular queue 350 has properties similar to those of the circular queue 300 of FIG. 3A. Specifically, pointers 352, 356 accessing the queue 350 wrap around when they reach the end of the queue 350, and the queue 350 is configured to store variable-sized data units in one or more buffer lines. In an example, Data Unit #1 is written to the buffer line 303 by the packet processing accelerator 102 or the CPU 104. Next, first and second portions of Data Unit #2 are written to the buffer lines 303, 302, respectively, by the packet processing accelerator 102 or the CPU 104. After each of these writes, a write pointer 352 is advanced within the circular queue 350.

At this point, a Data Unit #3 is to be written to the circular queue 350, potentially starting at a location determined by the write pointer 352 that immediately follows an end of the Data Unit #2. In an example, the packet processing accelerator 102 or the CPU 104 identifies a wrap-around condition in the circular queue 350. Specifically, the packet processing accelerator 102 or the CPU 104 identifies that the Data Unit #3, if written to the queue 350 starting at the location determined by the write pointer 352, would include a portion of data disposed in the buffer line 301 and another portion of data disposed in the buffer line 302. This would occur due to the write pointer 352 wrapping around to the start of the queue 350 upon reaching the end of the queue 350. As explained above, this condition is undesirable. The packet processing accelerator 102 or the CPU 104 identifies this condition, in an embodiment, based on the fact that the amount of available space in the queue 350 between the write pointer 352 and the end of the queue 350 (equal to X bytes in the example of FIG. 3B) is less than a size of the Data Unit #3 (equal to Y bytes in the example of FIG. 3B).

Based on the identification of the wrap-around condition, the packet processing accelerator 102 or the CPU 104 writes dummy data units 354 to the last line of the circular queue 350, starting at the location determined by the write pointer 352. As shown in FIG. 3B, the dummy data units 354 complete the last buffer line. After writing the dummy data units 354, the write pointer 352 wraps around to the start of the queue, and the packet processing accelerator 102 or the CPU 104 writes the Data Unit #3 to the buffer line 301 starting at a location of the advanced write pointer.

The writing of the Data Unit #3 to the head of the queue 350 in this manner enables the packet processing accelerator 102 or the CPU 104 (i.e., the component reading from the queue 350 based on a read pointer 356) to read the Data Unit #3 using a single memory access and without reading from both of the non-contiguous buffer lines 301, 302. This is in contrast to the multiple memory accesses that would be required to read the Data Unit #3 if the Data Unit #3 was written to both of the buffer lines 301, 302 (e.g., as was illustrated in FIG. 3A). The writing of the dummy data units 354 at the end of the queue 350 thus enables more efficient passing of data units between the packet processing accelerator 102 and the CPU 104 by decreasing a number of memory accesses required in reading certain data units from the queue 350.

Figure 4A:
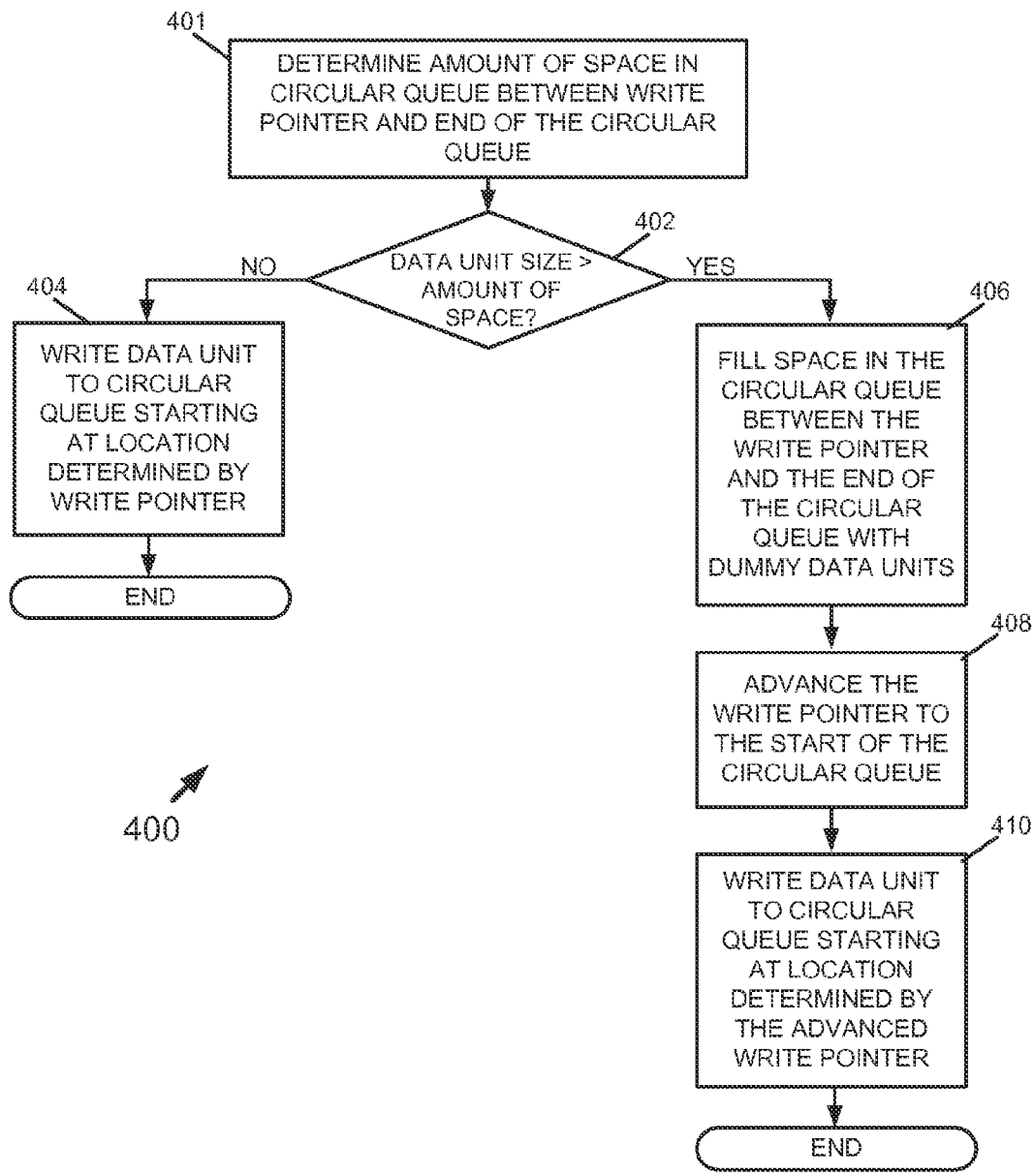
FIG. 4A is a flow diagram depicting example steps performed by a packet processing accelerator or CPU in writing a data unit to the circular queue of FIG. 3B, in accordance with an embodiment of the disclosure.

FIG. 4A is a flow diagram 400 depicting example steps performed by the packet processing accelerator 102 or the CPU 104 in writing a data unit to the circular queue 350 of FIG. 3B, in accordance with an embodiment of the disclosure. At 401, an amount of space between a write pointer and an end of the circular queue 350 is determined. At 402, it is determined whether a size of the data unit to be written to the circular queue 350 is greater than the amount of space available. If the size of the data unit is not greater than the amount of space, at 404, the data unit is written to the circular queue starting at a location determined by the write pointer. If the size of the data unit is greater than the amount of space, this indicates a presence of a wrap-around condition. Based on the identification of the wrap-around condition, at 406, a space in the circular queue 350 between the write pointer and the end of the circular queue 350 is filled with dummy data units. At 408, the write pointer is advanced to the start of the circular queue 350 as a result of the write pointer wrapping around to the start of the queue 350 upon reaching the end of the queue 350. At 410, the data unit is written to the circular queue 350 starting at a location determined by the advanced write pointer.

Figure 4B:
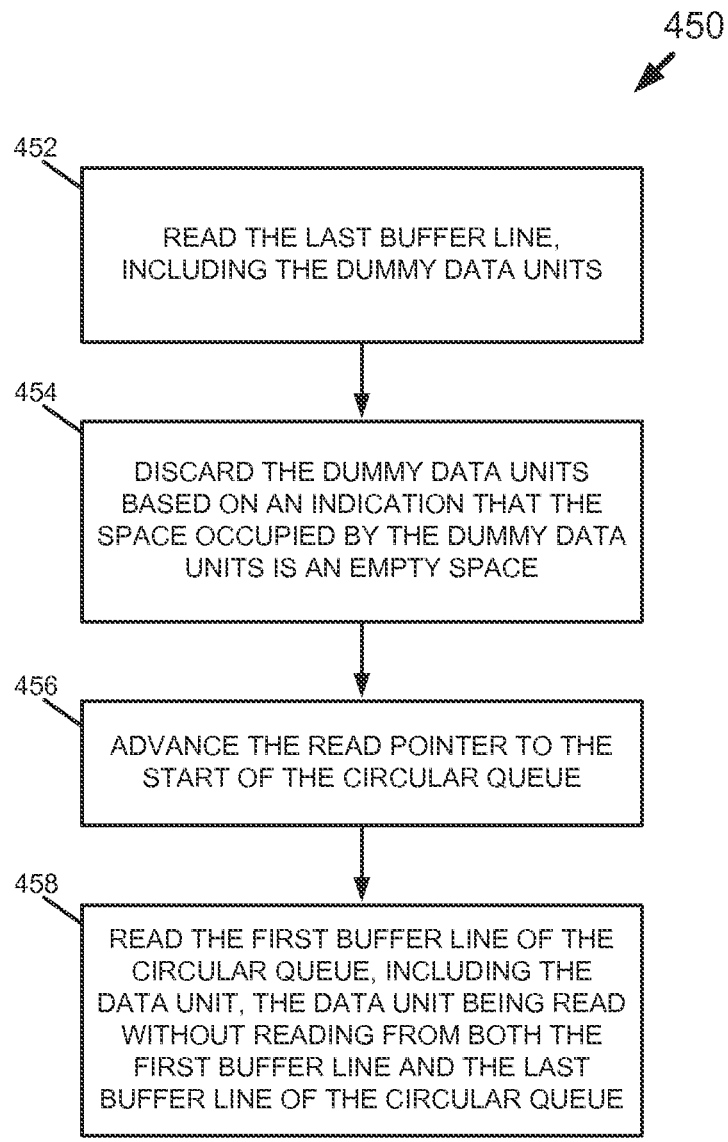
FIG. 4B is a flow diagram depicting example steps performed by a packet processing accelerator or CPU in reading a data unit from the circular queue of FIG. 3B, in accordance with an embodiment of the disclosure.

The writing of dummy data units to the circular queue 350, as described above with reference to FIGS. 3B and 4A, enables a particular data unit to be read from the circular queue 350 without reading from both of the non-contiguous buffer lines 301, 302. FIG. 4B is a flow diagram 450 depicting example steps performed by the packet processing accelerator 102 or the CPU 104 in reading the particular data unit from the circular queue 350 of FIG. 3B, in accordance with an embodiment of the disclosure. As data units are read from the queue 350 by the packet processing accelerator 102 or the CPU 104, the read pointer 356 is advanced. The read pointer 356 eventually reaches the buffer line 302, which is the last buffer line of the cyclic queue 350. At 452, the buffer line 302, including the dummy data units 354, is read.

At 454, the dummy data units 354 are discarded. In an example, the dummy data units 354 are discarded based on an indication included in the dummy data units 354, where the indication indicates that a space occupied by the dummy data units 354 is an empty space. In an example, all data units (i.e., both null data units comprising dummy data units and valid data units) written to the circular queue 350 include a field (e.g., a binary, one-bit field) that specifies whether the data unit is null or not. Thus, for example, if the data unit includes the field having a first logical value, the component that reads the data unit identifies the data unit as comprising dummy data units and subsequently discards the data unit, in an embodiment. Conversely, if a data unit includes the field having a second logical value, the component that reads the data unit identifies the data unit as being a valid data unit corresponding to a packet and does not discard the data unit, in an embodiment.

In these examples, the packet processing accelerator 102 and the CPU 104 respectively are configured to (i) read a data unit from the circular queue 350, (ii) identify a presence or absence of the indication that the space occupied by the data unit is an empty space, and (iii) discard or not discard the data unit based on the presence or absence of the indication. Specifically, the CPU 104 performs these steps if the circular queue 350 is the receive queue 210 of the buffer 106, and the packet processing accelerator 104 performs these steps if the circular queue 350 is the send queue 212 of the buffer 106.

At 456, following the reading of the buffer line 302, the read pointer 356 wraps around to the start of the queue 350. At 458, the buffer line 301, which is the first buffer line of the circular queue 350, is read. In reading the buffer line 301, the Data Unit #3 is read. Thus, the Data Unit #3 is read without reading from both the first and last lines 301, 302 of the circular queue 350.

As noted above with reference to FIG. 1A, the packet processing accelerator 102 and the CPU 104 respectively are configured to store data to a memory 108. Specifically, in an example, upon receipt of the packet 118, the packet processing accelerator 102 defines the data unit corresponding to the packet 118 and stores the payload of the packet to the memory 108. The data unit corresponding to the packet 118 includes a pointer to a location of the payload of the packet 118 in the memory 108, in an embodiment. Additionally, in an example, data units stored in the circular queues 210, 212 are moved from the circular queues 210, 212 to an internal cache of the memory 108. In an example where the buffer 106 comprises a portion of the memory 108, the data units are moved from a first portion of the memory 108 (e.g., a portion of the memory 108 including the circular queue 210 or the circular queue 212) to a second portion of the memory 108 (e.g., a portion of the memory including the internal cache of the memory 108). The movement occurs without explicit action by the packet processing accelerator 102 or the CPU 104, in an embodiment.

Figure 5A:
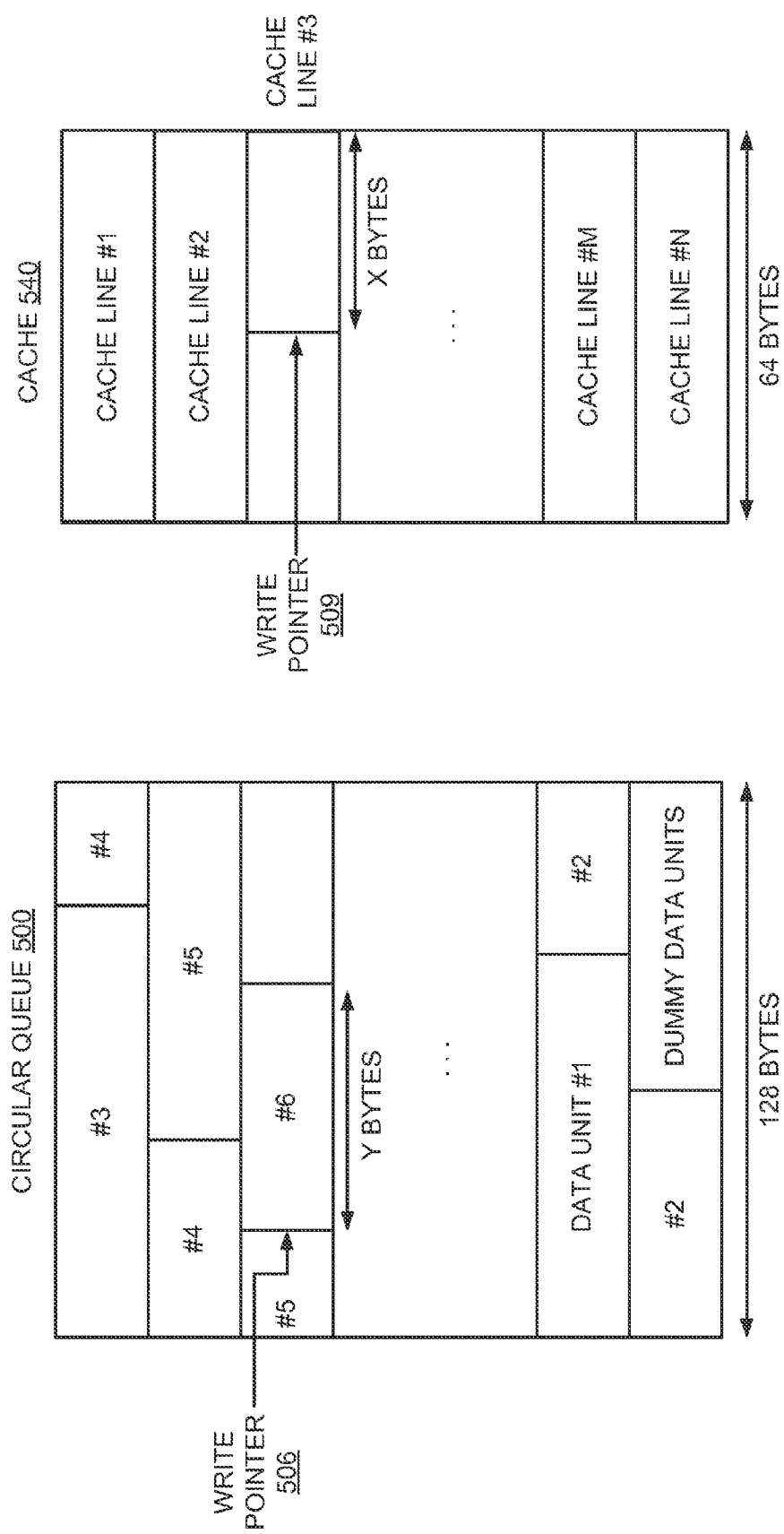
FIGS. 5A and 5B are block diagrams illustrating features of a circular queue and cache defined in a memory in accordance with an embodiment of the disclosure.

To illustrate aspects of the movement of data units from the circular queues 210, 212 to the internal cache of the memory 108, reference is made to FIG. 5A. It is noted that FIG. 5A does not illustrate the use of dummy data units. The description of FIG. 5A is intended to be contrasted with that of FIG. 5B, which does illustrate the use of dummy data units. This figure depicts a circular queue 500 configured to store data units having different sizes, in an embodiment. In an example, the circular queue 500 is one of the circular queues 210, 212 depicted in FIG. 2. The circular queue 500 of FIG. 5A has properties similar to those of the circular queues 300, 350 of FIGS. 3A and 3B and has a fixed width (e.g., 128 bytes in the example of FIG. 5A) that is equal to the fixed width of the buffer 106.

FIG. 5A also depicts example features of a cache 540. The cache 540 comprises a first portion of the memory 108, in an example. As described above, the buffer 106 is part of the memory 108, in an example. Because the circular queue 500 is part of the buffer 106, the circular queue comprises a second portion of the memory 108, in an example. As illustrated in the figure, the cache 540 has a fixed width (e.g., 64 bytes in the example of FIG. 5A) that is different from the fixed width of the circular queue 500, in an embodiment. In an example, each buffer line in the circular queue 500 has a size of 128 bytes, and a cache line size of the cache 540 is 64 bytes. The buffer line size of 128 bytes relates to a typical size of a data unit that is written as a burst access to the circular queue 500. The cache 540 is configured to store data, including data units moved from the circular queue 500, in one or more lines of the cache 540. When the data units are moved from the queue 500 to the cache 540, there is a possibility that a data unit could be stored in a number of lines of the cache 540 that is greater than a minimum number of lines necessary to store the data unit. For example, if the cache 540 has a fixed width of 64 bytes, then a minimum number of lines necessary to store a 128-byte data unit is two. Storing the 128-byte data unit in three or more lines of the cache 540 is an example of storing a data unit in a number of lines that is greater than the minimum number of lines necessary to store the data unit. This possibility is illustrated in FIG. 5A and described below with reference to that figure.

In FIG. 5A, after Data Unit #3, Data Unit #4, and Data Unit #5 are written to portions of the first, second, and third buffer lines comprising the queue 500, a Data Unit #6 is to be written to the circular queue 500 starting at a location determined by a write pointer 506. The Data Unit #6 has a size of Y bytes. The Data Unit #6, upon being moved from the circular queue 500 to the cache 540, would be stored starting at a location of the cache 540 determined by a second write pointer 509, which is included in a third cache line of the cache 540. An amount of available space in the third line of the cache 540 is equal to X bytes, where Y is greater than X. Thus, if the Data Unit #6 is written to the circular queue 500 starting at the location determined by the write pointer 506, this data unit, upon being moved from the circular queue 500 to the cache 540, would be disposed in two lines of the cache 540 (i.e., a first X bytes of the Data Unit #6 would be stored in the third line of the cache 540, and a remaining portion of the Data Unit #6 would be stored in the fourth line of the cache 540).

Because the Y bytes of the Data Unit #6 are less than the 64 bytes comprising the fixed width of the cache 540 in the example of FIG. 5A, the Data Unit #6 would be disposed in a number of lines of the cache 540 that is greater than a minimum number of lines necessary to store the Data Unit #6. In other words, although the Y bytes of the Data Unit #6 could fit within a single cache line of the cache 540, in the scenario detailed above, the Data Unit #6 would be disposed in two cache lines of the cache 540. This is undesirable, as it requires multiple memory accesses to write the Data Unit #6 to multiple lines of the cache 540, which is in contrast to the single memory access that would be required to write the Data Unit #6 to a single cache line, in an embodiment. Further, subsequent reading of the Data Unit #6 from the multiple lines of the cache 540 would require multiple memory accesses instead of a single memory access, in an embodiment.

In order to eliminate the occurrence of such undesirable situations, dummy data units similar to those described above with reference to FIGS. 3A-4B are intentionally written to the queue. The determination as to when the dummy data units should be written to a queue and the actual writing of the dummy data units are performed by the packet processing accelerator 102 or the CPU 104 writing to the queue. Specifically, in an example, the packet processing accelerator 102 writes the dummy data units to the receive queue 210, and the CPU 104 writes the dummy data units to the send queue 212.

Figure 5B:
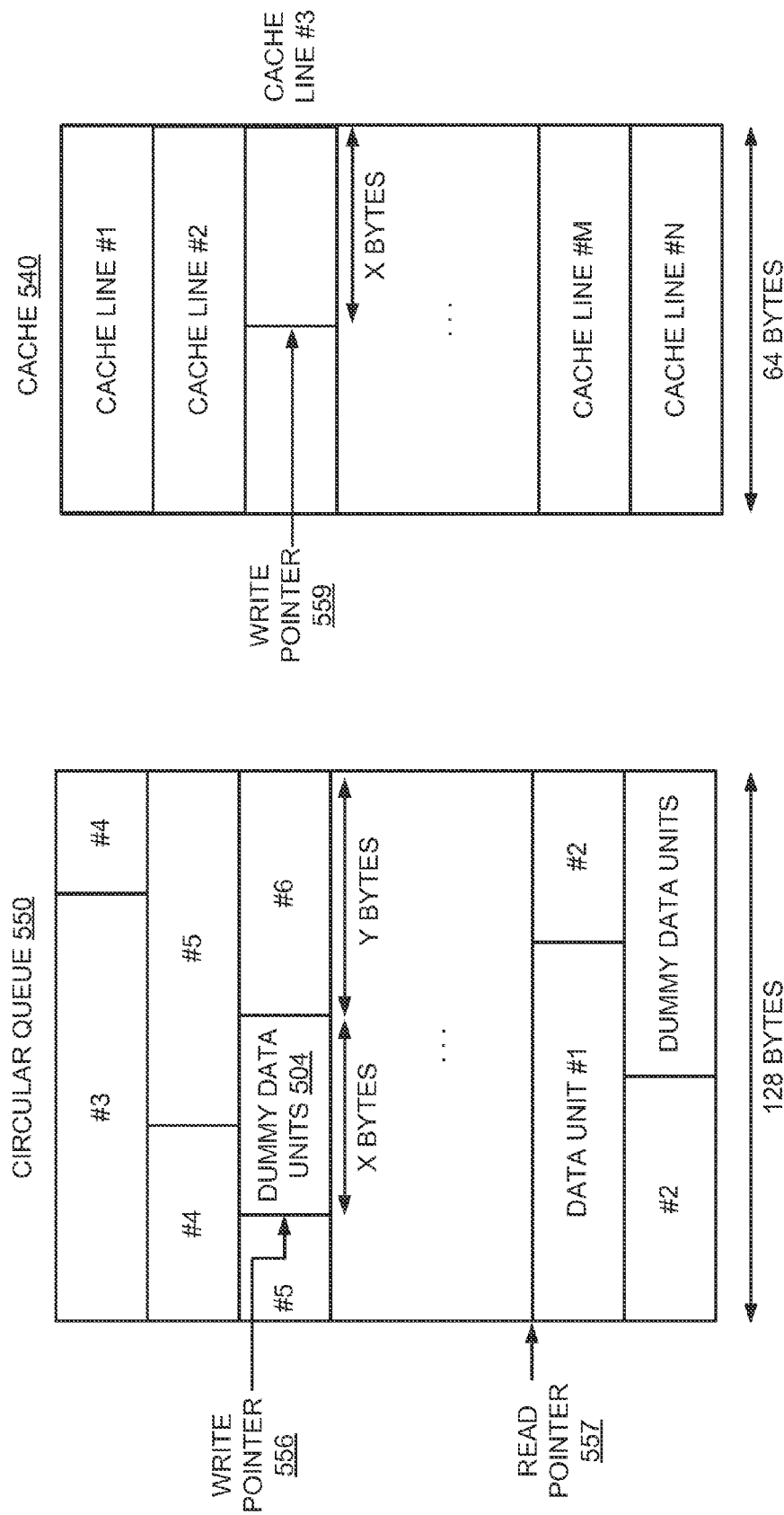

To illustrate an example writing of dummy data units to a queue in accordance with an embodiment of the disclosure, reference is made to FIG. 5B. In this figure, after the writing of Data Unit #3, Data Unit #4, and Data Unit #5 to portions of the first, second, and third buffer lines of the circular queue 550, a write pointer 556 is positioned immediately after the Data Unit #5, and a Data Unit #6 is to be written to the circular queue 550. As in the example of FIG. 5A, the Data Unit #6 has a size of Y bytes. A next data unit written to the circular queue 550 starting at a location determined by the write pointer 556 will be later moved from the circular queue 550 to the cache 540. The moving causes this data unit to be stored in the cache 540 starting at a location determined by a second write pointer 559, which is included in a third cache line of the cache 540. As in the example of FIG. 5A, an amount of available space in the third line of the cache 540 is equal to X bytes, where Y is greater than X.

In an example, the packet processing accelerator 102 or the CPU 104 makes a determination that the Data Unit #6, if written to the circular queue 550 starting at the location determined by the write pointer 556, would be disposed in a number of lines of the cache 540 (e.g., 2 cache lines in the example of FIG. 5B) that is greater than a minimum number of lines necessary to store the Data Unit #6 (e.g., a single cache line). As explained above, this is undesirable. Based on this determination, the packet processing accelerator 102 or the CPU 104 writes dummy data units 504 to the circular queue 550 starting at the location determined by the write pointer 556. As shown in FIG. 5B, the dummy data units 504 have a size of X bytes, which is equal to the amount of available space in the third line of the cache 540. After writing the dummy data units 504 to the circular queue 550, the write pointer 556 is advanced to a location in the queue 550 immediately following an end of the dummy data units 504, and the Data Unit #6 is written to the queue 550 starting at a location determined by the write pointer that has been advanced.

After the writing of the dummy data units 504 and the Data Unit #6 to the circular queue 550, the dummy data units 504 and the Data Unit #6 are moved from the circular queue 550 to the cache 540. This moving causes the dummy data units 504 to be stored in the cache 540 starting at the location determined by the second write pointer 559, which is included in the third cache line of the cache 540. Because the dummy data units 504 have the size of X bytes that is equal to the amount of available space in the third cache line, the dummy data units 504 complete the third cache line. The second write pointer 559 is then advanced to a beginning of a fourth line of the cache 540. The Data Unit #6 is written to the cache 540 starting at the location determined by the advanced write pointer 559.

Because the Y bytes of the Data Unit #6 are less than the 64 bytes comprising the fixed width of the cache 540 in the example of FIG. 5B, the Data Unit #6 is stored in a single line of the cache 540, which is the minimum number of lines of the cache 540 necessary to store the Data Unit #6. Storing the Data Unit #6 to the single line of the cache 540 enables the Data Unit #6 to be written to the cache 540 and read from the cache 540 using a minimum number of memory accesses. The writing of the dummy data units 504 to the circular queue 550 and the subsequent moving of these dummy data units 504 to the cache 540 thus enables more efficient storage and retrieval of data units to and from the cache 540.

Figure 6:
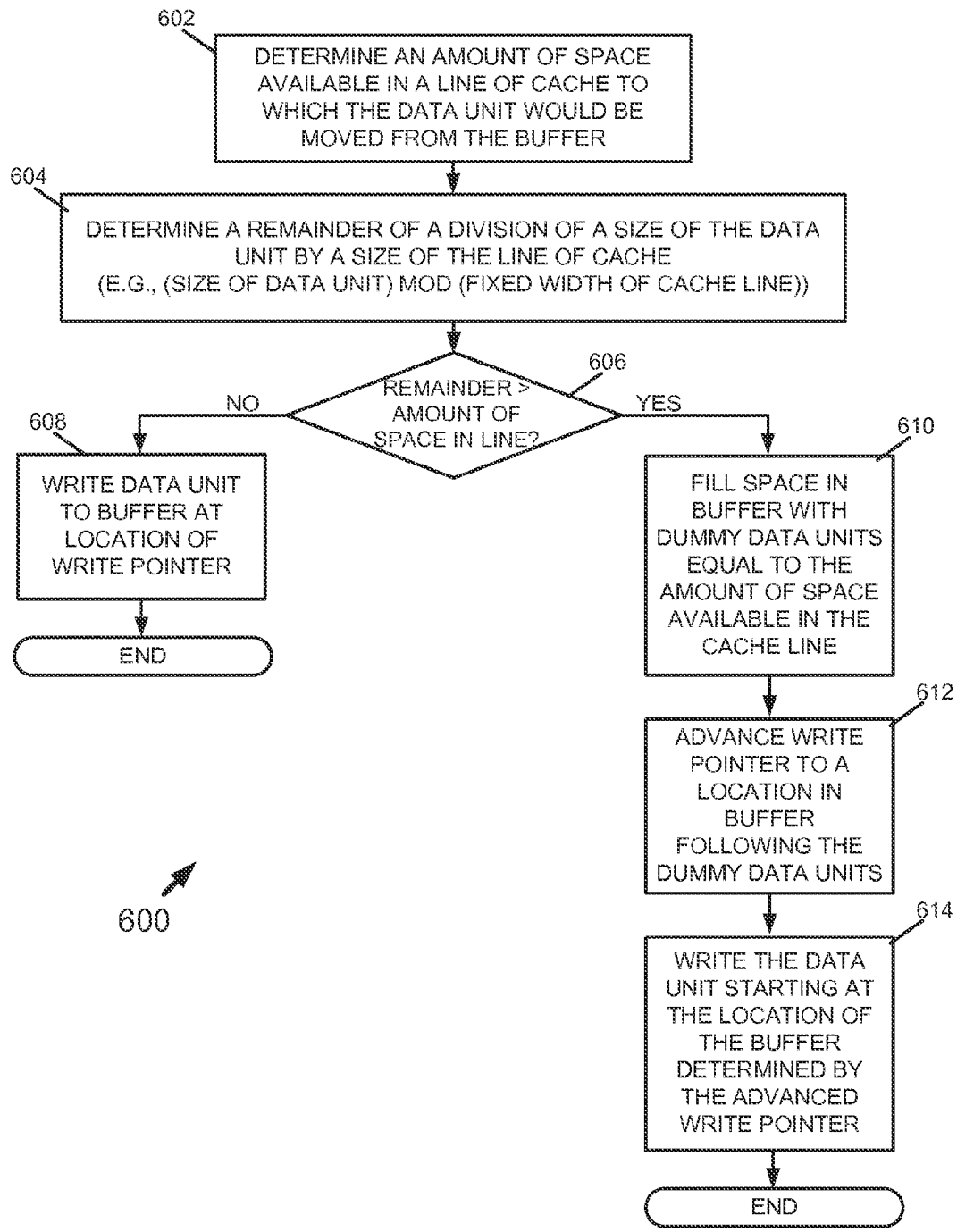
FIG. 6 is a flow diagram depicting example steps performed by a packet processing accelerator or CPU in writing a data unit to the circular queue of FIG. 5B, in accordance with an embodiment of the disclosure.

FIG. 6 is a flow diagram 600 depicting example steps performed by the packet processing accelerator 102 or the CPU 104 in writing a data unit to the circular queue 550 of FIG. 5B, in accordance with an embodiment of the disclosure. As described above with reference to FIG. 5B, a data unit written to the circular queue 550 is moved from the queue 550 to the cache 540, in an embodiment. At 602, the packet processing accelerator 102 or the CPU 104 determines an amount of free space available in a line of the cache 540 to which the data unit would be moved if written to the circular queue 550 starting at a location determined by a write pointer. In the example of FIG. 5B, the amount of free space available in the third cache line to which the Data Unit #6 would be moved is equal to X bytes.

At 604, the packet processing accelerator 102 or the CPU 104 determines a remainder of a division of a size of the data unit by the fixed width of a line of the cache 540, where the remainder is a second amount of space. In an example, the remainder is determined based on $$\text{remainder} = (\text{size of the data unit}) \bmod (\text{fixed width of the cache line}),$$

where "mod" is the modulo operator. In the example of FIG. 5B, the size of the Data Unit #6 is Y bytes, and the fixed width of the line of the cache 540 is 64 bytes. Assuming, for example, that Y is equal to 40, such that the Data Unit #6 has a size of 40 bytes, the remainder (i.e., equal to 40 bytes mod 64 bytes) is 40 bytes. At 606, it is determined whether the remainder is greater than the amount of free space available in the line of the cache 540 to which the data unit would be moved. As noted above, in the example of FIG. 5B, the amount of free space available in the third cache line to which the Data Unit #6 would be moved is equal to X bytes. Assuming, for example, that X is equal to 32 bytes, then the example remainder of 40 bytes is greater than the amount of free space available in the third cache line.

If the result of the determination at 606 is "no," then at 608, the data unit is written to the circular queue 550 starting at the location of the circular queue 550 determined by the write pointer. Conversely, if the result of the determination at 606 is "yes," then at 610, dummy data units having a size equal to the amount of free space available in the line of the cache 540 to which the data unit would be moved is written to the circular queue 550. The dummy data units are written to the circular queue 550 starting at the location of the circular queue 550 determined by the write pointer. At 612, the write pointer is advanced to a location in the circular queue 550 immediately following the dummy data units. At 614, the data unit is written to the circular queue 550 starting at the location determined by the advanced write pointer.

The writing of dummy data units to the circular queue 550, as described above with reference to FIGS. 5B and 6, enables a data unit to be moved to the cache 540 of the memory 108 in a minimum number of cache lines necessary to store the data unit.

It is noted that in an embodiment, the packet processing accelerator 102 and the CPU 104 respectively are configured to write dummy data units to the buffer 106 under both the conditions described above with reference to FIGS. 3B-4A and the conditions described above with reference to FIGS. 5B-6. Thus, in an example, when writing a data unit to the buffer 106, the packet processing accelerator 102 and the CPU 104 respectively are configured to (i) determine a presence or an absence of a wrap-around condition and write dummy data units, if necessary (i.e., as described above with reference to FIGS. 3B-4A), and also (ii) determine a presence or absence of a condition under which the data unit would be stored in a number of lines of the memory 108 that is greater than a minimum number of lines necessary to store the data unit and write dummy data units, if necessary (i.e., as described above with reference to FIGS. 5B-6). Similarly, in an embodiment, the packet processing accelerator 102 and the CPU 104 respectively are configured to read and process dummy data units from the buffer 106 under both the conditions described above with reference to FIGS. 3B-4B and the conditions described above with reference to FIGS. 5B-6.

Figure 7:
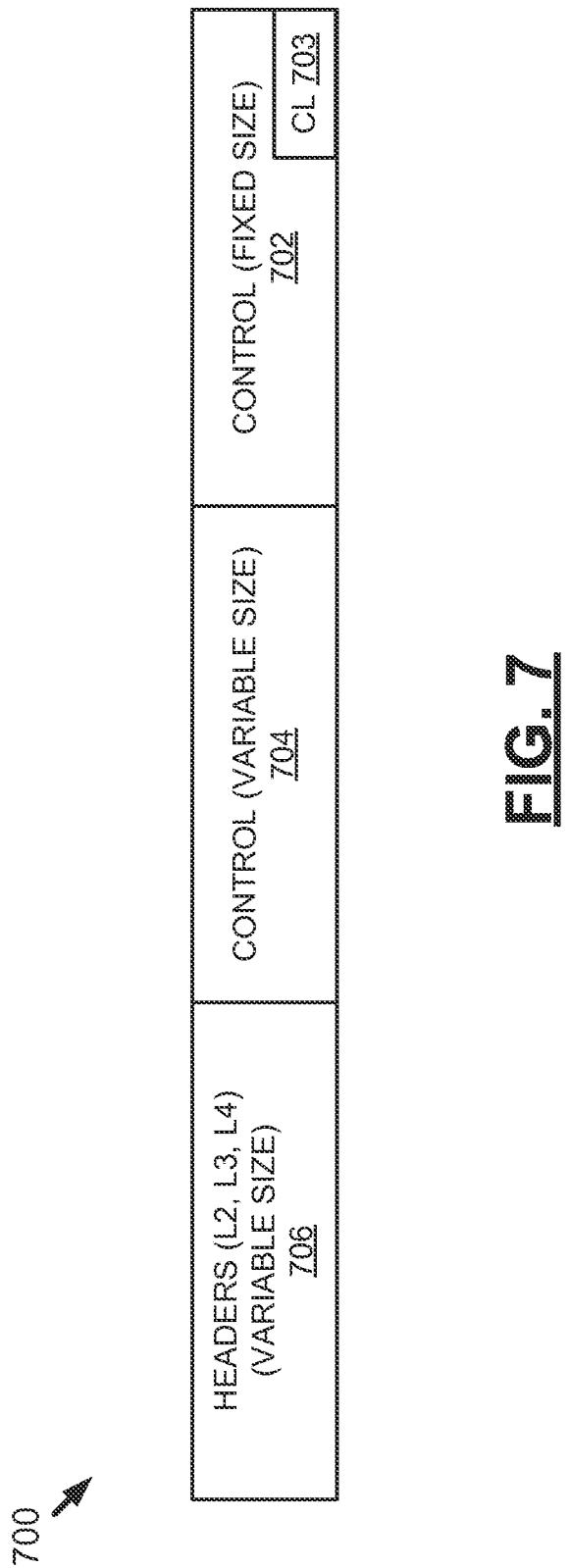
FIG. 7 depicts a data unit configured to be stored in the buffer of FIG. 1A, in accordance with an embodiment of the disclosure.

As described herein, the send and receive queues 210, 212 of the buffer 106 are configured to be populated, at a given point in time, with data units having different sizes (e.g., the send queue 210 is configured to be populated, at a given point in time, with a first data unit having a size of 30 bytes and a second data unit having a size of 60 bytes). The use of data units having different sizes allows content to be stored in a data unit only when the content is necessary, thus allowing sizes of data units to be kept to a minimum. An example of content that may be stored in a variable-sized data unit depending on whether it is needed or not is a packet's headers. As described above, a data unit corresponds to a packet received from a network, and in certain instances, it is useful to extract the headers from the packet and include the headers as part of the data unit. Such extraction of the headers and building of the data unit are performed by the packet processing accelerator 102. An example format for a variable-sized data unit is illustrated in FIG. 7. This figure shows that the variable-sized data unit 700 includes a portion 706 for storing L2, L3, and L4 headers of a packet that corresponds to the data unit 700, in an embodiment. The portion 706 itself has different sizes in different examples, depending on the headers and sizes of the headers stored in the field 706.

In addition to the portion 706 for storing the packet headers, the data unit 700 also includes a fixed-size control portion 702. The fixed-size control portion 702 includes various control and status fields with which the packet processing accelerator 102 and/or the CPU 104 interact. Although other portions of the data unit (i.e., portions 704, 706) are optional and only included in the data unit 700 if necessary, the fixed-size control portion 702 comprises a portion of all data units, in an example. The control and status fields of the fixed-size control portion 702 include a size field 703 that defines a size of the data unit 700. The size of the data unit 700 defined by the size field 703 is based on a size of the fixed-size control portion 702 and sizes of any other portions (e.g., optional portions 704, 706) that are included in the data unit 700, in an embodiment.

In an example, the fixed-size control portion 702 has a size of 16 bytes. Thus, a minimum size of the data unit 700 is 16 bytes, in an embodiment. Further, in an example, the size of the data unit 700 is some multiple of 16 bytes, with a maximum size of 128 bytes. In examples where the buffer 106 has a fixed width of 128 bytes (e.g., as illustrated in the example of FIGS. 5A and 5B), a size of the dummy data units is between 16 bytes and (128-16) bytes. It is noted that the sizes described herein are examples only.

Another example of content that may be stored in a variable-sized data unit depending on whether it is needed or not is information to be passed between the packet processing accelerator 102 and the CPU 104. Such information is used, in an example, to pass conclusions from the packet processing accelerator 102 to the CPU 104 or to pass intent from the CPU 104 to the packet processing accelerator 102. Such information is used, in other examples, to add new packet processing flows (e.g., due to new customer requests). This information is also used to change the work partition between the packet processing accelerator 102 and the CPU 104 when processing packets, in an embodiment. Further, such information is used to implement fixes and workarounds for problems identified in the field, in an embodiment. In the example of FIG. 7, this information is stored in a variable-sized control portion 704 of the data unit 700.

In general, the variable-sized control portion 704 is used to store any additional control or status data (e.g., additional metadata) beyond what is stored in the fixed-size control portion 702. In an example, the CPU 104 sends a group of fragments with a shared header (e.g., a scatter-gather list), such that a first data unit has a larger size and includes both control data and headers of a corresponding packet, and a second data unit has a smaller size and includes only a pointer to the fragments' payload in the memory 108. In this example, the first data unit uses the variable-sized control portion 704 to store additional control data beyond what is stored in the fixed-size control portion 702 and uses the portion 706 for storing the headers.

In another example, where a packet has a very small size, the entire packet is stored in a data unit. This promotes efficiency because it eliminates a need to store a payload of the packet to the memory 108 and subsequently retrieve the payload from the memory 108. In this example, the variable-sized control portion 704 is used to store the payload of the packet, and the portion 706 is used to store the headers of the packet.

Figure 8:
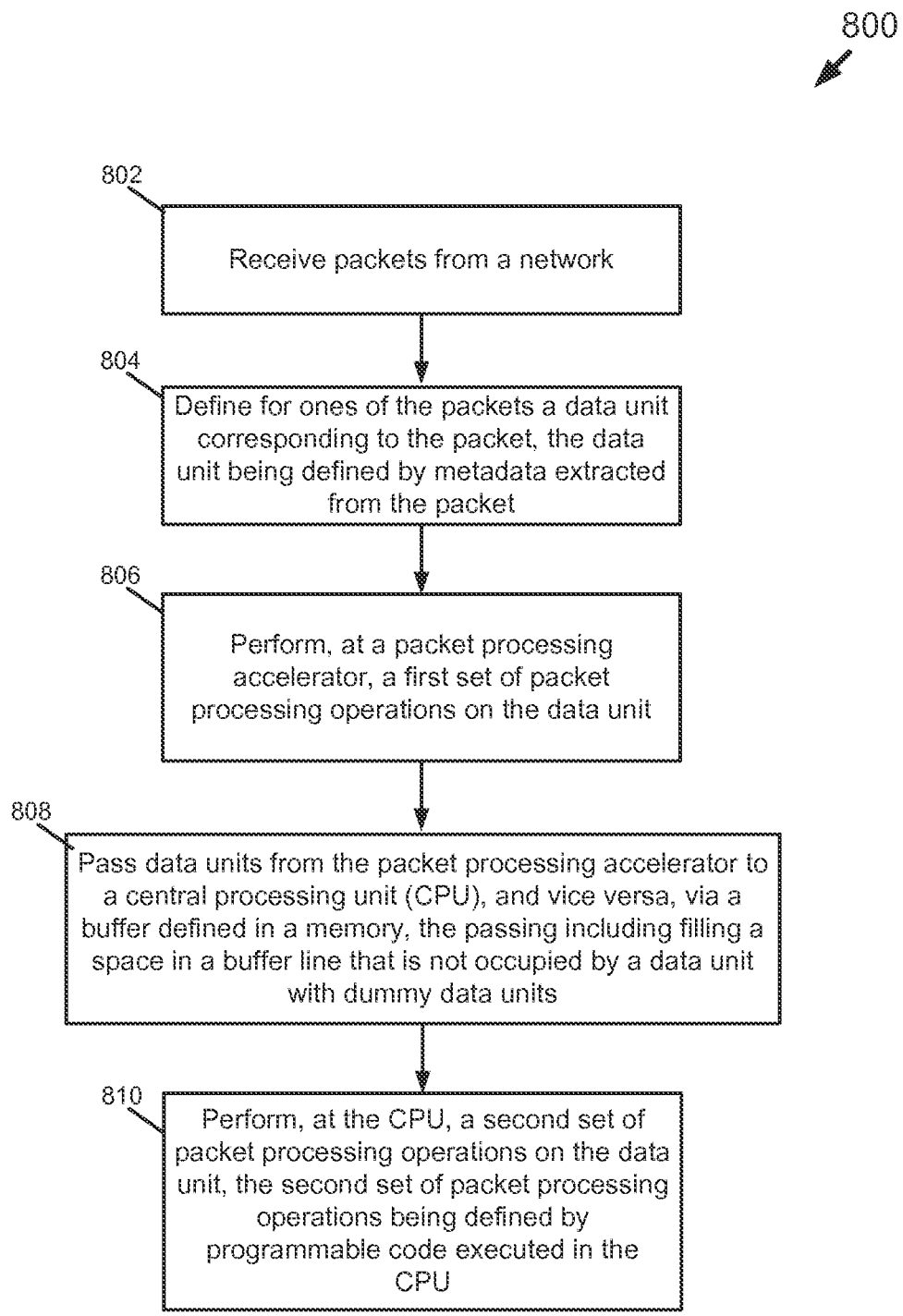
FIG. 8 is a flow diagram depicting steps of a method for packet processing in accordance with an embodiment of the disclosure.

FIG. 8 is a flow diagram 800 depicting steps of a method for packet processing in accordance with an embodiment of the disclosure. At 802, packets are received from a network. At 804, a data unit corresponding to a packet is defined for ones of the packets, where the data unit is defined by metadata related to the packet. At 806, a first set of packet processing operations is performed on the data unit at a packet processing accelerator. At 808, data units are passed from the packet processing accelerator to a central processing unit (CPU), and vice versa, via a buffer defined in a memory. The buffer has a fixed width and is configured to store data units in one or more lines of the buffer. The passing of the data units includes filling a space in a buffer line that is not occupied by a data unit with dummy data units when the data unit does not fill a complete buffer line, where the dummy data units include an indication that the space occupied by the dummy data units is empty. At 810, a second set of packet processing operations is performed on the data unit at the CPU, where the second set of packet processing operations is defined by programmable code and is different from the first set of packet processing operations.

This application uses examples to illustrate the invention. The patentable scope of the invention may include other examples.

What is claimed is:

1. A network device, comprising:
a packet processing accelerator configured to (i) receive packets from a network, (ii) define for ones of the packets a data unit corresponding to the packet, the data unit being defined at least by metadata related to the packet, and (iii) perform a first set of packet processing operations on the data unit;
a central processing unit (CPU) configured to perform a second set of packet processing operations on the data unit, the second set of packet processing operations being different from the first set of packet processing operations and being defined by programmable code executed in the CPU; and
a buffer defined in a memory and configured to pass data units from the packet processing accelerator to the CPU, and vice versa, the buffer having a fixed width and configured to store data units in one or more lines of the buffer, wherein dummy data units fill a space in a buffer line that is not occupied by a data unit when the data unit does not fill a complete buffer line, the dummy data units including an indication that the space occupied by the dummy data units is an empty space,
wherein the packet processing accelerator and the CPU respectively are configured to:
when writing a data unit to the buffer, the data unit having a size that is greater than an amount of available space in a single buffer line:
write a first portion of the data unit in the single buffer line; and
write a second portion of the data unit in at least one other buffer line that is different than the single buffer line.

2. The network device of claim 1, wherein the packet processing accelerator and the CPU respectively are configured to:
when writing a data unit to the buffer:
write dummy data units to a line of the buffer; and
write the data unit starting at a buffer location immediately following an end of the dummy data units.

3. The network device of claim 2, wherein the packet processing accelerator and the CPU respectively are configured to:
read the dummy data units and the data unit from the buffer; and
discard the dummy data units based on the indication, the dummy data units being discarded without performing the first or second set of packet processing operations on the dummy data units.

4. The network device of claim 2, wherein the memory comprises:
an internal cache having a fixed width that is less than that of the buffer, wherein the memory is configured to move the dummy data units and the data unit from the buffer to the internal cache, the dummy data units being dimensioned to complete a line of the internal cache not occupied by the data unit.

5. The network device of claim 2, wherein the buffer comprises:
a circular queue including a plurality of buffer lines with a last buffer line that is connected to a first buffer line via a linking indication, wherein the line of the buffer to which the dummy data units are written is the first buffer line, the last buffer line, or another line of the plurality of buffer lines.

6. The network device of claim 1, wherein the buffer comprises:
a circular queue configured to queue data units during the passing of the data units between the packet processing accelerator and the CPU, the circular queue comprising a plurality of buffer lines including a last buffer line connected to a first buffer line via a linking indication,
wherein the packet processing accelerator and the CPU respectively are configured to write a plurality of data units to the circular queue, the writing of the data units causing the circular queue to be populated, at a given time, with data units having different lengths.

7. The network device of claim 6, wherein the packet processing accelerator and the CPU respectively are configured to:
when writing a data unit to the circular queue:
identify a wrap-around condition in the circular queue, the wrap-around condition occurring when an amount of space between a write pointer and an end of the circular queue is less than a size of the data unit; and
based on the identification of the wrap-around condition, (i) write dummy data units to the last buffer line of the circular queue, the dummy data units being dimensioned to complete the last buffer line and having a size equal to the amount of space, and (ii) write the data unit to the first buffer line of the circular queue.

8. The network device of claim 7, wherein the packet processing accelerator and the CPU respectively are configured to:
read the last buffer line including the dummy data units;
discard the dummy data units based on the indication that the space occupied by the dummy data units is an empty space; and
read the first buffer line including the data unit, the data unit being read without reading from both the first buffer line and the last buffer line.

9. The network device of claim 1, wherein the packet processing accelerator and the CPU respectively are configured to:
write a plurality of data units to the buffer, with one or more of the data units being stored starting at locations of the buffer that are not beginnings of buffer lines, the writing of the data units causing the buffer to be populated, at a given time, with data units having different sizes.

10. A method for processing data units, the method comprising:
receiving packets from a network;
defining for ones of the packets a data unit corresponding to the packet, the data unit being defined at least by metadata related to the packet;
performing, at a packet processing accelerator, a first set of packet processing operations on the data unit;
passing data units from the packet processing accelerator to a central processing unit (CPU), and vice versa, via a buffer defined in a memory, the buffer having a fixed width and configured to store data units in one or more lines of the buffer, the passing including filling a space in a buffer line that is not occupied by a data unit with dummy data units when the data unit does not fill a complete buffer line, the dummy data units including an indication that the space occupied by the dummy data units is an empty space;
performing, at the CPU, a second set of packet processing operations on the data unit, the second set of packet processing operations being defined by programmable code, and the second set of packet processing operations being different from the first set of packet processing operations; and when writing a data unit to the buffer, the data unit having a size that is greater than an amount of available space in a single buffer line,
- writing a first portion of the data unit in the single buffer line, and
- writing a second portion of the data unit in at least one other buffer line that is different than the single buffer line.

11. The method of claim 10, further comprising:
when writing a data unit to the buffer:
- writing dummy data units to a line of the buffer; and
- writing the data unit starting at a buffer location immediately following an end of the dummy data units.

12. The method of claim 11, further comprising:
reading the dummy data units and the data unit from the buffer; and
discarding the dummy data units based on the indication, the dummy data units being discarded without performing the first or second set of packet processing operations on the dummy data units.

13. The method of claim 11, further comprising:
moving the dummy data units and the data unit from the buffer to an internal cache of the memory, the internal cache having a fixed width that is less than that of the buffer, the dummy units being dimensioned to complete a line of the internal cache not occupied by the data unit.

14. The method of claim 11, wherein the buffer comprises a circular queue including a plurality of buffer lines with a last buffer line that is connected to a first buffer line via a linking indication, the method further comprising:
writing the dummy data units to the first buffer line, the last buffer line, or another line of the plurality of buffer lines.

15. The method of claim 10, wherein the buffer comprises a circular queue configured to queue data units during the passing of the data units between the packet processing accelerator and the CPU, the circular queue comprising a plurality of buffer lines including a last buffer line connected to a first buffer line via a linking indication, the method further comprising:
writing a plurality of data units to the circular queue, the writing of the data units causing the circular queue to be populated, at a given time, with data units having different lengths.

16. The method of claim 15, further comprising:
when writing a data unit to the circular queue:
- identifying a wrap-around condition in the circular queue, the wrap-around condition occurring when an amount of space between a write pointer and an end of the circular queue is less than a size of the data unit; and
- based on the identification of the wrap-around condition, (i) writing dummy data units to the last buffer line of the circular queue, the dummy data units being dimensioned to complete the last buffer line and having a size equal to the amount of space, and (ii) writing the data unit to the first buffer line of the circular queue.

17. The method of claim 16, further comprising:
reading the last buffer line including the dummy data units;
discarding the dummy data units based on the indication that the space occupied by the dummy data units is an empty space; and
reading the first buffer line including the data unit, the data unit being read without reading from both the first buffer line and the last buffer line.

18. The method of claim 10, further comprising:
writing a plurality of data units to the buffer, with one or more of the data units being stored starting at locations of the buffer that are not beginnings of buffer lines, the writing of the data units causing the buffer to be populated, at a given time, with data units having different sizes.

* * * * *